Figure 1:
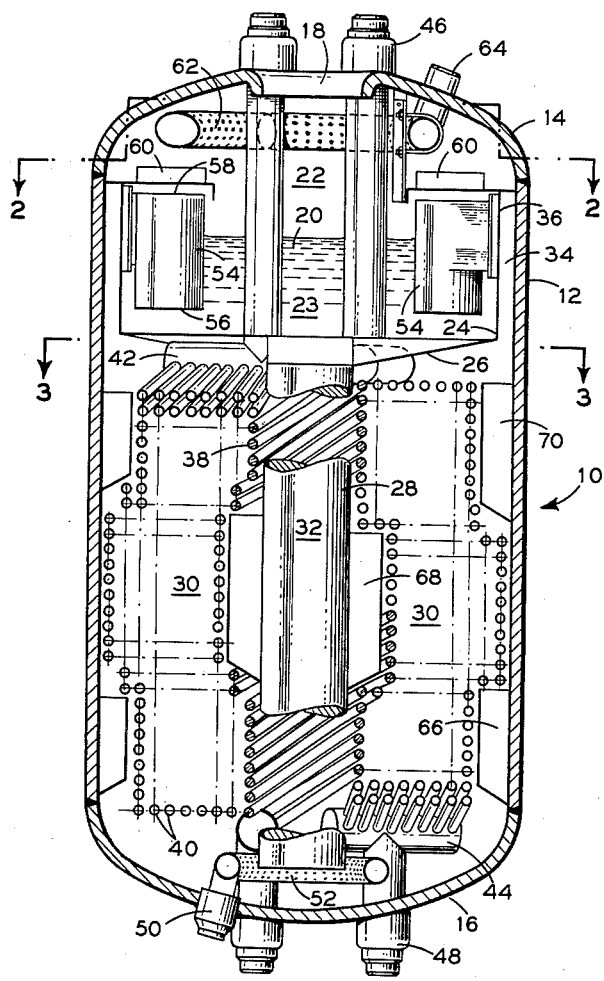

INVENTORS
Johannes H. Ammon
De Carr C. Braddy
George W. Kessler

ATTORNEY

Jan. 1, 1963 J. H. AMMON ET AL 3,071,119
VAPOR GENERATING UNIT
Filed Feb. 23, 1956 2 Sheets-Sheet 2

INVENTOR.
Johannes H. Ammon
BY De Carr C. Braddy
George W. Kessler

ATTORNEY 3,071,119
VAPOR GENERATING UNIT
Johannes H. Ammon, Barberton, Ohio, and De Carr C. Braddy, New York, and George W. Kessler, Westbury, N.Y., assignors to The Babcock & Wilcox Company, New York, N.Y., a corporation of New Jersey
Filed Feb. 23, 1956, Ser. No. 567,180
7 Claims. (Cl. 122—34)

This invention relates in general to vapor generating units, and more particularly, to a vapor generating unit which is indirectly heated by a hot fluid flowing through tubes within the unit.

In modern day industries such as petroleum refining, chemical manufacture, and atomic energy, there are available high temperature fluids from which heat may be extracted for useful purposes to improve the economy of a particular industrial operation. A most useful method of extraction is to generate steam.

The present invention is directed to a steam generating unit which is applicable to such processes for extracting heat from hot fluids. The unit is specifically arranged to occupy a minimum space while transferring large quantities of heat. The entire vapor generator of the invention is contained within a vertically elongated pressure vessel. Within the interior of the vessel there is, under operative conditions, a water level in the upper portion. Above this level there is a vapor space with an outlet therefrom. Below the water level, baffle plates form a vapor generating chamber arranged to discharge a vapor-liquid mixture above the water level. The liquid is then separated from the vapor. A downcomer passes the separated liquid into the lower portion of the steam generation chamber for a natural circulation of the liquid. There is a hot liquid heated tube bundle disposed within the vapor generating chamber from which the heat is derived to generate vapor in the chamber. This vapor along with the liquid as a mixture passes out through the outlet of the generation chamber through vapor and liquid separating devices which are arranged to pass the vapor to the vapor space and thence to the vapor outlet and to return the separated liquid to the downcomers. More specifically, the invention has the tube bundle composed of a plurality of superposed horizontal rows of tubes arranged for parallel flow of heating fluid therethrough and forming a longitudinal passageway in the center for the liquid downcomer and each of the rows is spirally wound and intertwined with the other rows to constitute a tube bundle free of high thermally induced expansion stresses.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred form of our invention.

Figure 2:
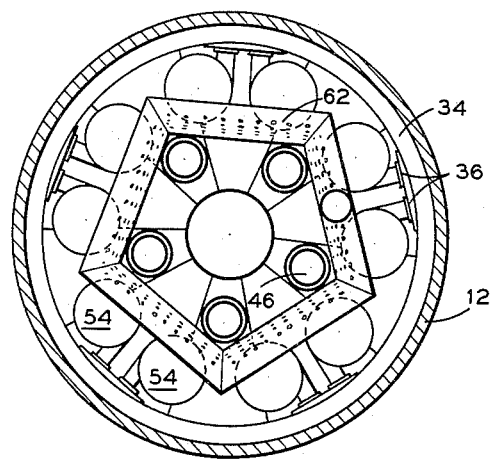
Figure 3:
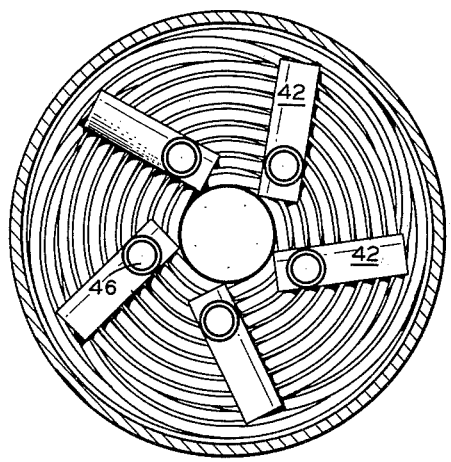

Of the drawings:
FIG. 1 is a vertical side section of the vapor generating unit;
FIG. 2 is a transverse section taken along the line 2—2 of FIG. 1; and
FIG. 3 is a transverse section of the unit taken along the line 3—3 of FIG. 1.

The vapor generating unit 10 has a vertically elongated pressure vessel 12 having dished heads 14 and 16 closing the ends thereof and arranged with a manhole opening 18 in its upper end, and which is normally closed by a cover (not shown).

During normal operation of the unit there is a liquid level 20 of vaporizable liquid which forms a vapor space 22 in the upper portion of the pressure vessel 12 and a liquid space 23. Baffle plates 24, 26, 28 in conjunction with the walls of the pressure vessel 12 form a vapor generation chamber 30 which is annular in shape and predominantly located below the liquid level surface 20. Conjunctively, the plate 28 forms a downcomer 32 which provides a passage from the liquid space 23 to the lower portion of the steam generation chamber 30. At the upper end of the vapor generation chamber the baffle plate 24 is shaped as an annular ring and forms an annular vapor-liquid mixture chamber 34 having discharge openings 36 emanating radially inwardly toward the longitudinal central axis of the unit.

Within the vapor generation chamber 30 there is disposed a vertically elongated tube bundle 38 which is made of five horizontally arranged rows of tubes which are connected for the parallel flow of heating fluid therethrough. Each row of tubes 40 emanates from an inlet header 42 and is spirally wound and intertwined with the other rows so that the rows have a lead or vertical displacement of at least the height of the five rows for each complete revolution within the chamber as the tubes progressively wind to substantially fill the chamber 30. There are five hot fluid inlet headers 42, and five outlet headers 44, one for each row, disposed at opposite ends of the steam generation chamber and between which each spiral tube row is connected. Each inlet header is fed by a hot fluid inlet 46 and each outlet header has an individual hot fluid outlet 48. A feed liquid inlet 50 is arranged to discharge the vaporizable liquid from a distributing ring 52 at the bottom of the vapor generation chamber 30 at a position where the feed liquid mixes with the liquid from the downcomer 32.

Ten hollow upright whirl chamber separators 54 of the cyclone type are arranged in a ring to receive a vapor-liquid mixture from the outlets 36 of the annular vapor-liquid chamber 34 of the steam generation chamber 30. The whirl chamber separators are further so arranged with respect to the liquid level 20 that the separated liquid passes out of the bottom 56 of each separator into the liquid space 23 while the separated vapor passes out of the top 58 of the separator through a corrugated type steam scrubber 60 into the vapor space 22. Thence the vapor passes through the pentagon shaped dry pipe 62 and through the vapor outlet 64 to the point of use.

During operation of the unit a hot fluid, such as petroleum, liquid metal, water or gas, flows through the inlets 46 into the individual headers 42 and through the tubes of the heating tube bundle 38 wherein it gives up heat before passing through the liquid outlets 48. The vaporizable liquid within the pressure vessel 12 fills the liquid space 23 and the downcomer 32 and due to the thermal siphonic effect of the heat being transferred by the hot fluid within the tubes 38, the liquid passes up over the tube bundle 38 and through the chamber 30. As the liquid passes up therethrough, baffles 66, 68, 70 cause the resulting vapor-liquid mixture to take a tortuous path in order to assure uniform distribution of the vapor throughout the mixture. As the vapor-liquid mixture passes up through the chamber, the liquid is further vaporized and the mixture flows into the vapor-liquid chamber 34 and thence through the separating means or whirl chambers 54. The separated liquid passes out the bottom of the whirl chambers and down the downcomer 32 while the vapor passes out to the vapor space as previously described.

The vapor generating unit of the present invention, due to its compactness, is advantageously applicable in many situations where space is at a premium, such as mobile nuclear power plants and in chemical plants where danger of explosion from the process must be minimized by placing components in special sealed areas. This compactness is primarily due to the arrangement whereby definite means are provided for the recirculation of separated liquid within the pressure vessel and by the effective operation of the whirl chamber type of separators.

The fact that all of the equipment necessary to the separation of a natural circulation steam generator is disposed, as in the present invention, within the confines of one pressure shell materially reduces the complexity of the piping necessary to connect the unit into the system which it serves. The efficient operation of the unit is attributed to the placement of the heating surface in the lower portion of the pressure vessel with the distinct paths for circulation of the vaporizable liquid and the effective vapor separation means disposed in the upper portion of the vessel whereby a high rate of circulation may be maintained to allow large quantities of vapor to be generated within a small volume.

While in accordance with the provisions of the statutes, we have illustrated and described herein a specific form of the invention now known to us, those skilled in the art will understand that changes may be made in the form of the apparatus disclosed without departing from the spirit of the invention covered by our claims, and that certain features of the invention may sometimes be used to advantage without a corresponding use of the other features.

What is claimed is:

1. A vapor generating unit comprising walls forming a vertically elongated pressure vessel of circular cross-section arranged to operate with a liquid level separating an upper vapor space and a lower liquid space, a vapor outlet from said vapor space, plate means coacting with said pressure vessel walls and forming a vertically elongated vapor generating chamber and a downcomer passage within the liquid space of said vessel, said plate means extending downwardly toward and being closely spaced above the bottom of said vapor generating chamber and arranged with respect to the pressure vessel walls so that the vapor generating chamber fills a greatly predominating part of the lower portion of said vessel, a vapor-liquid mixture outlet located in the uppermost portion of said vapor generating chamber, vapor-liquid separating means positioned above said vapor generating chamber and arranged to receive the vapor-liquid mixture from said outlet while discharging separated liquid directly to said liquid space and separated vapor directly to said vapor space, said vapor-liquid separating means arranged with respect to said plate means to maintain said liquid level above said vapor generating chamber and in direct communication with said downcomer passage, said vapor generating chamber, vapor-liquid separating means, liquid space and said downcomer passage being serially connected and forming a distinct vaporizable fluid circulation flow circuit within said vessel, a plurality of tubes constituting a vertically elongated bundle arranged to substantially fill said vapor generating chamber, and means for passing a heating fluid through the tubes of said bundle.

2. A vapor generating unit comprising walls forming a vertically elongated pressure vessel of circular cross-section arranged to operate with a liquid level separating an upper vapor space and a lower liquid space, a vapor outlet from said vapor space, plate means coacting with said pressure vessel walls to form a vertically elongated vapor generating chamber and a downcomer passage within the lower portion of said vessel, said plate means extending downwardly to substantially the bottom of said vapor generation chamber and arranged with respect to the pressure vessel walls to form the vapor generation chamber to substantially fill the lower portion of said vessel, a vapor-liquid mixture outlet from the uppermost portion of said vapor generation chamber, vapor-liquid separating means arranged above said vapor generation chamber to receive the vapor-liquid mixture from said outlet while discharging separated liquid to said liquid space and vapor to said vapor space, said vapor-liquid separating means arranged with respect to said plate means to maintain said liquid level and liquid volume above said vapor generation chamber in direct communication with said downcomer passage, said vapor generating chamber, vapor-liquid separating means, liquid space and said downcomer being serially connected to form a distinct vaporizable fluid circulation flow circuit within said vessel, said vapor-liquid separating means including a plurality of hollow upright whirl chamber separators, a plurality of tubes constituting a vertically elongated bundle arranged to substantially fill said vapor generation chamber, and means for passing a heating fluid through the tubes of said bundle.

3. A vapor generating unit comprising walls forming a vertically elongated pressure vessel of circular cross-section arranged to operate with a liquid level separating an upper vapor space and a lower liquid space, a vapor outlet from said vapor space, plate means coacting with said pressure vessel walls to form a vertically elongated vapor generating chamber and a downcomer passage within the lower portion of said vessel, said plate means extending downwardly to substantially the bottom of said vapor generation chamber and arranged with respect to the pressure vessel walls to form the vapor generation chamber to substantially fill the lower portion of said vessel, a vapor-liquid mixture outlet from the uppermost portion of said vapor generation chamber, vapor-liquid separating means arranged above said vapor generation chamber to receive the vapor-liquid mixture from said outlet while discharging separated liquid to said liquid space and vapor to said vapor space, said vapor-liquid separating means arranged with respect to said plate means to maintain said liquid level and liquid volume above said vapor generation chamber in direct communication with said downcomer passage, said vapor generation chamber, vapor-liquid separating means, liquid space and said downcomer being serially connected to form a distinct vaporizable fluid circulation flow circuit within said vessel, a plurality of tubes constituting a vertically elongated bundle arranged to substantially fill said vapor generation chamber, said tube bundle including a plurality of superposed horizontal rows of tubes arranged for parallel flow of heating fluid therethrough and forming a longitudinal passage in the center thereof, and means for passing a heating fluid through the tubes of said bundle.

4. A vapor generating unit comprising walls forming a vertically elongated pressure vessel of circular cross-section arranged to operate with a liquid level separating an upper vapor space and a lower liquid space, a vapor outlet from said vapor space, plate means coacting with said pressure vessel walls to form a vertically elongated vapor generating chamber and a downcomer passage within the lower portion of said vessel, said plate means extending downwardly to substantially the bottom of said vapor generation chamber and arranged with respect to the pressure vessel walls to form the vapor generation chamber to substantially fill the lower portion of said vessel, a vapor-liquid mixture outlet from the uppermost portion of said vapor generation chamber, vapor-liquid separating means arranged above said vapor generation chamber to receive the vapor-liquid mixture from said outlet while discharging separated liquid to said liquid space and vapor to said vapor space, said vapor-liquid separating means arranged with respect to said plate means to maintain said liquid level and liquid volume above said vapor generation chamber in direct communication with said downcomer passage, said vapor generation chamber, vapor-liquid separating means, liquid space and said downcomer being serially connected to form a distinct vaporizable fluid circulation flow circuit within said vessel, a plurality of tubes constituting a vertically elongated bundle arranged to substantially fill said vapor generation chamber, said tube bundle including a plurality of superposed horizontal rows of tubes arranged for parallel flow of heating fluid therethrough and forming a longitudinal passage in the center thereof, each row of tubes being spirally wound and intertwined with the other rows, and means for passing a heating fluid through the tubes of said bundle.

5. A vapor generating unit comprising walls forming a vertically elongated pressure vessel of circular cross-section arranged to operate with a liquid level separating an upper vapor space and a lower liquid space, a vapor outlet from said vapor space, plate means coacting with said pressure vessel walls to form a vertically elongated vapor generating chamber and a downcomer passage within the lower portion of said vessel, said plate means extending downwardly to substantially the bottom of said vapor generation chamber and arranged with respect to the pressure vessel walls to form the vapor generation chamber to substantially fill the lower portion of said vessel, a vapor-liquid mixture outlet from the uppermost portion of said vapor generation chamber, vapor-liquid separating means arranged above said vapor generation chamber to receive the vapor-liquid mixture from said outlet while discharging separated liquid to said liquid space and vapor to said vapor space, said vapor-liquid separating means arranged with respect to said plate means to maintain said liquid level and liquid volume above said vapor generation chamber in direct communication with said downcomer passage, said vapor generation chamber, vapor-liquid separating means, liquid space and said downcomer being serially connected to form a distinct vaporizable fluid circulation flow circuit within said vessel, a plurality of tubes constituting a vertically elongated bundle arranged to substantially fill said vapor generation chamber, said downcomer arranged to pass through a passage in the center of the tube bundle, and means for passing a heating fluid through the tubes of said bundle.

6. A vapor generating unit comprising walls forming a vertically elongated pressure vessel of circular cross-section arranged to operate with a liquid level separating an upper vapor space and a lower liquid space, a vapor outlet from said vapor space, plate means coacting with said pressure vessel walls to form a vertically elongated vapor generating chamber and a downcomer passage within the lower portion of said vessel, said plate means extending downwardly to substantially the bottom of said vapor generation chamber and arranged with respect to the pressure vessel walls to form the vapor generation chamber to substantially fill the lower portion of said vessel, a vapor-liquid mixture outlet from the uppermost portion of said vapor generation chamber, vapor-liquid separating means arranged above said vapor generation chamber to receive the vapor-liquid mixture from said outlet while discharging separated liquid to said liquid space and vapor to said vapor space, said vapor-liquid separating means arranged with respect to said plate means to maintain said liquid level and liquid volume above said vapor generation chamber in direct communication with said downcomer passage, said vapor generation chamber, vapor-liquid separating means, liquid space and said downcomer being serially connected to form a distinct vaporizable fluid circulation flow circuit within said vessel, a plurality of tubes constituting a vertically elongated bundle arranged to substantially fill said vapor generation chamber, said tube bundle including a plurality of superposed horizontal rows of tubes arranged for parallel flow of heating fluid therethrough and forming a longitudinal passage in the center thereof, each row of tubes being spirally wound and intertwined with the other rows, said downcomer arranged to pass through said passage in the center of the tube bundle, and means for passing a heating fluid through the tubes of said bundle.

7. A vapor generating unit comprising walls forming a vertically elongated pressure vessel of circular cross-section arranged to operate with a liquid level separating an upper vapor space and a lower liquid space, a vapor outlet from said vapor space, plate means coacting with said pressure vessel walls to form a vertically elongated vapor generating chamber and a downcomer passage within the lower portion of said vessel, said plate means extending downwardly to substantially the bottom of said vapor generation chamber and arranged with respect to the pressure vessel walls to form the vapor generation chamber to substantially fill the lower portion of said vessel, a vapor-liquid mixture outlet from the uppermost portion of said vapor generation chamber, vapor-liquid separating means arranged above said vapor generation chamber to receive the vapor-liquid mixture from said outlet while discharging separated liquid to said liquid space and vapor to said vapor space, said vapor-liquid separating means arranged with respect to said plate means to maintain said liquid level and liquid volume above said vapor generation chamber in direct communication with said downcomer passage, said vapor generation chamber, vapor-liquid separating means, liquid space and said downcomer being serially connected to form a distinct vaporizable fluid circulation flow circuit within said vessel, said vapor-liquid separating means including a plurality of hollow upright whirl chamber separators, a plurality of tubes constituting a vertically elongated bundle arranged to substantially fill said vapor generation chamber, said tube bundle including a plurality of superposed horizontal rows of tubes arranged for parallel flow of heating fluid therethrough and forming a longitudinal passage in the center thereof, each row of tubes being spirally wound and intertwined with the other rows, said downcomer arranged to pass through said passage in the center of the tube bundle, and means for passing a heating fluid through the tubes of said bundle including individual inlet and outlet headers for each of said rows.

References Cited in the file of this patent

UNITED STATES PATENTS

| | | |
|---|---|---|
| 434,972 | Baird | Aug. 26, 1890 |
| 898,147 | Von Seemen | Sept. 8, 1908 |
| 1,067,010 | Dunn | July 8, 1913 |
| 1,465,020 | Monti | Aug. 14, 1923 |
| 2,143,191 | Fletcher et al. | Jan. 10, 1939 |
| 2,191,671 | Kuhner | Feb. 27, 1940 |

FOREIGN PATENTS

| | | |
|---|---|---|
| 690,993 | Great Britain | May 6, 1953 |